United States Patent
Ji et al.

(10) Patent No.: US 10,162,568 B2
(45) Date of Patent: Dec. 25, 2018

(54) METHOD FOR SEARCHING MATCHING KEY OF STORAGE DEVICE AND SERVER SYSTEM INCLUDING THE SAME

(71) Applicant: SAMSUNG ELECTRONICS CO., LTD., Suwon-si, Gyeonggi-Do (KR)

(72) Inventors: Soo-Young Ji, Suwon-si (KR); Donghun Lee, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 116 days.

(21) Appl. No.: 15/242,642

(22) Filed: Aug. 22, 2016

(65) Prior Publication Data
US 2017/0075628 A1    Mar. 16, 2017

(30) Foreign Application Priority Data
Sep. 16, 2015 (KR) .................. 10-2015-0131022

(51) Int. Cl.
*G06F 3/06* (2006.01)
*G06F 12/02* (2006.01)

(52) U.S. Cl.
CPC .......... *G06F 3/0656* (2013.01); *G06F 3/0611* (2013.01); *G06F 3/0659* (2013.01); *G06F 3/0688* (2013.01); *G06F 12/0246* (2013.01); *G06F 2212/1024* (2013.01); *G06F 2212/7201* (2013.01); *G06F 2212/7203* (2013.01)

(58) Field of Classification Search
CPC .... G06F 3/0611; G06F 3/0656; G06F 3/0659; G06F 3/0685; G06F 3/0688; G06F 12/0246; G06F 2212/202; G06F 2212/1024; G06F 2212/7201; G06F 2212/7203

USPC .................................. 711/103, 117, 118, 154
See application file for complete search history.

(56) References Cited

U.S. PATENT DOCUMENTS

| | | |
|---|---|---|
| 7,679,133 B2 | 3/2010 | Son et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,819,335 B1 | 8/2014 | Salessi et al. |
| 8,996,781 B2 | 3/2015 | Schuette et al. |
| 9,003,071 B2 | 4/2015 | Liu |

(Continued)

FOREIGN PATENT DOCUMENTS

| | | |
|---|---|---|
| JP | 2015-26263 A | 2/2015 |
| KR | 10-2013-0107070 A | 10/2013 |
| KR | 10-2014-0053309 A | 5/2014 |

*Primary Examiner* — Gary J Portka
(74) *Attorney, Agent, or Firm* — Volentine, Whitt & Francos, PLLC

(57) ABSTRACT

A matching key search method of a server system including a storage device, the storage device including a nonvolatile memory device and a buffer memory. The matching key search method includes receiving a search command for a keyword from a host, reading data from a memory area of the memory device corresponding to an address included in the search command and storing the read data in the buffer memory, determining whether the read data matches the keyword, transmitting a result of the determining to the host without transmitting the read data to the host, and generating a matching key table with reference to the result of the determining and storing the generated matching key table in the buffer memory.

19 Claims, 13 Drawing Sheets

(56) References Cited

U.S. PATENT DOCUMENTS

| | | |
|---|---|---|
| 2009/0106486 A1* | 4/2009 | Kim .................... G06F 12/0246 |
| | | 711/103 |
| 2011/0233648 A1 | 9/2011 | Seol et al. |
| 2013/0042056 A1 | 2/2013 | Shats et al. |
| 2013/0086311 A1 | 4/2013 | Huang et al. |
| 2013/0254455 A1 | 9/2013 | Shim et al. |
| 2014/0304464 A1 | 10/2014 | Bert |
| 2014/0317219 A1 | 10/2014 | Fitch et al. |
| 2015/0019798 A1 | 1/2015 | Huang |
| 2015/0032965 A1 | 1/2015 | Sugimoto et al. |
| 2016/0110292 A1* | 4/2016 | Choi .................... G06F 12/0866 |
| | | 711/103 |
| 2016/0364154 A1* | 12/2016 | Amidi .................... G06F 3/0613 |
| 2017/0075813 A1* | 3/2017 | Kaburaki ............ G06F 12/0897 |

* cited by examiner

METHOD FOR SEARCHING MATCHING KEY OF STORAGE DEVICE AND SERVER SYSTEM INCLUDING THE SAME

CROSS-REFERENCE TO RELATED APPLICATIONS

A claim of priority under 35 U.S.C. § 119 is made to Korean Patent Application No. 10-2015-0131022, filed on Sep. 16, 2015, the entire contents of which are hereby incorporated by reference.

BACKGROUND

The inventive concept described herein relates to semiconductor memory devices and, more particularly, to a method for searching a matching key of a storage device and a server system including the storage device.

Flash memory devices have been widely used as audio and image data storage media of information devices such as computers, smartphones, personal digital assistants (PDAs), digital cameras, camcorders, voice recorders, MP3 players, and handheld personal computers (PCs), for example. However, an erase operation needs to be performed in advance to write data into flash memory, and a unit of written data is often greater than that of erased data. This prevents a file system for a typical hard disk from being used when flash memory is used as an auxiliary memory. In addition, this implies that sequential input/output processing to flash memory is more effective than non-sequential input/output processing.

A representative example of a high-capacity storage device based on flash memory is a solid state drive (hereinafter referred to as "SSD"). With increasing demand for SSDs, the manner and/or purpose for which SSDs are used have become varied. For example, SSDs may be implemented for use by a server, for use by a client, for use by a data center, and the like. An SSD interface should provide optimum speed and reliability according to the purpose for which the SSD is implemented. To meet this demand, Serial Advanced Technology Attachment (SATA), Peripheral Component Interconnect express (PCIe), and Serial Attached SCSI (SAS) interfaces, or the like, are typically used as optimal SSD interfaces. Recently, NVM express (NVMe) spotlighted as the follow-up of a PCIe-based interface has been vigorously studied and applied.

An SSD may be used as a storage device of a user terminal, a data center, a server or the like. In particular, a server system consolidating a search function should be provided to offer optimal service quality to a client.

SUMMARY

The present disclosure relates to a storage device configured to perform a keyword matching operation and a keyword matching search method of the storage device.

Embodiments of inventive concept provide a matching key search method of a server system including a storage device. The storage device includes a memory device and a buffer memory configured to store data. The matching key search method includes receiving a search command for a keyword from a host, reading data from a memory area of the memory device corresponding to an address included in the search command and storing the read data in the buffer memory, determining whether the read data matches the keyword, transmitting a result of the determining to the host without transmitting the read data to the host, and generating a matching key table with reference to the result of the determining and storing the generated matching key table in the buffer memory.

Embodiments of inventive concept further provide a method for operating a storage device configured to receive a matching key search request from a host. The method includes analyzing the matching key search request to extract a keyword and an address range, allocating a memory area of a buffer memory for executing the matching key search request, reading original data corresponding to the address range from a nonvolatile memory device and storing the read original data in the memory area, determining whether information matching the keyword exists in the read original data, and writing information indicating a result of the determining into a key matching table of the buffer memory. The original data is read once from the nonvolatile memory device irrespective of the result of the determination.

Embodiments of the inventive concept still further provide a matching key search method of a server system including a storage device. The storage device includes a memory device and a buffer memory configured to store data. The matching key search method includes receiving a search command for a keyword from a host, reading data from a memory area of the memory device corresponding to an address included in the search command and storing the read data in the buffer memory, determining whether the read data matches the keyword, and transmitting a result of the determining to the host via a direct load/storage channel without transmitting the read data to the host.

BRIEF DESCRIPTION OF THE DRAWINGS

The forgoing and other features of the inventive concept will be described below in more detail with reference to the accompanying drawings, which show non-limiting embodiments of the inventive concept in which like reference characters refer to like parts throughout the different views. The drawings are not necessarily to scale, emphasis instead being placed upon illustrating principles of the inventive concepts. In the drawings.

DETAILED DESCRIPTION

Figure 1:
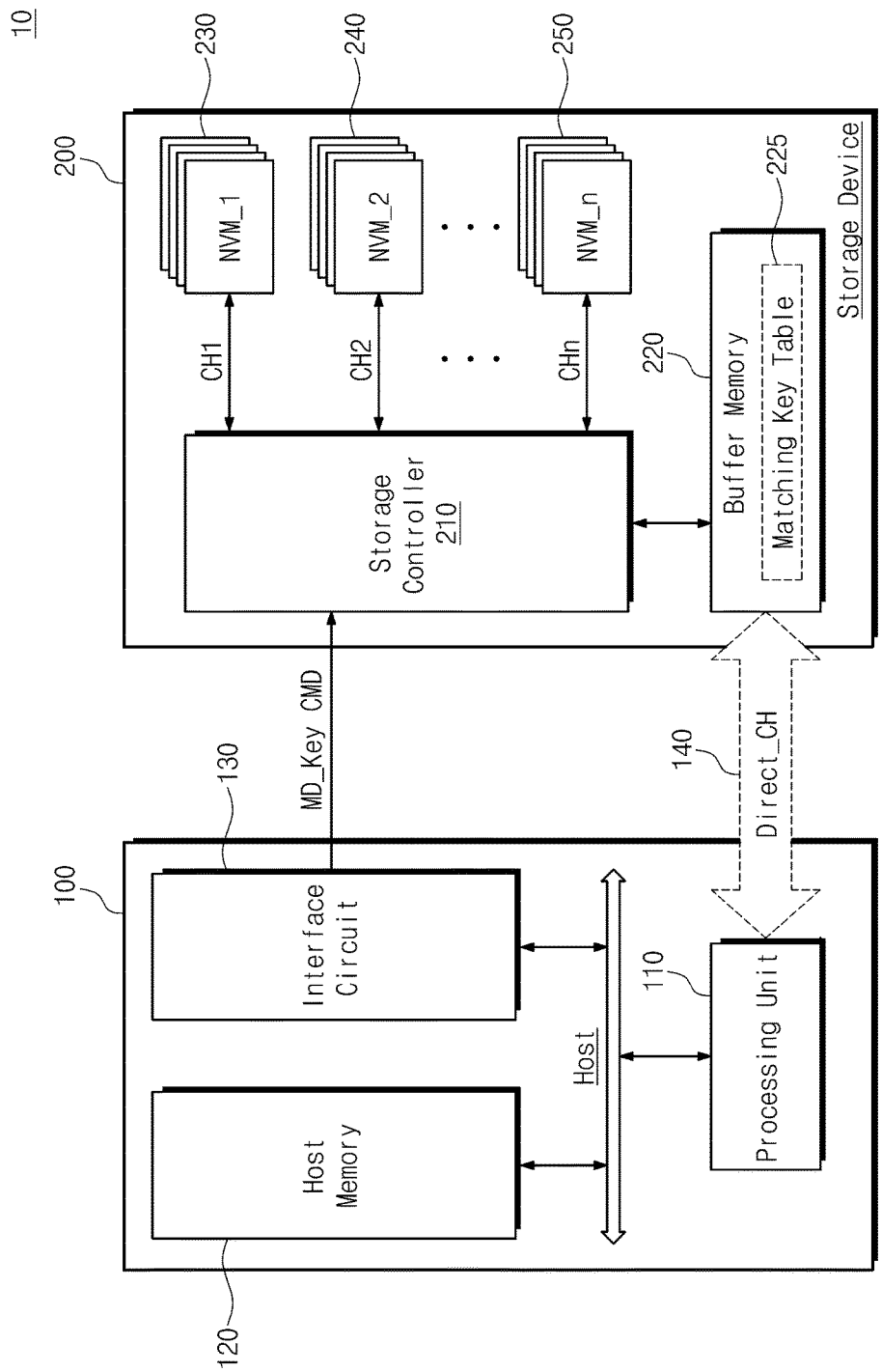
FIG. 1 illustrates a block diagram of a server system according to embodiments of the inventive concept.

Embodiments of the inventive concept will now be described more fully with reference to the accompanying drawings, in which some example embodiments are shown. Embodiments of the inventive concept may however be embodied in many different forms and should not be construed as being limited to the example embodiments set forth herein; rather, these example embodiments are provided so that this disclosure will be thorough and complete, and will fully convey the scope of example embodiments of the inventive concept to those of ordinary skill in the art. In the drawings, the thicknesses of layers and regions are exaggerated for clarity. Like reference characters and/or numerals in the drawings denote like elements, and thus their description may be omitted.

The terms used in this application, wherein only certain embodiments have been described, are not intended to limit the present embodiments. In the following description, the technical terms are used only to explain specific embodiments while not limiting the present embodiments. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which this inventive concept belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

As is traditional in the field of the inventive concept, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concept. Likewise, the blocks of the embodiments may be physically combined into more complex blocks without departing from the scope of the inventive concept.

FIG. 1 illustrates a block diagram of a server system 10 according to embodiments of the inventive concept. As illustrated, the server system 10 includes a host 100 and a storage device 200. The host 100 may access the storage device 200 to search for a keyword according to a request from a client. The storage device 200 has an in-storage computing (hereinafter referred to as "ISC") function. In response to a matching key search command MD_Key CMD from the host 100, the storage device 200 loads data of a selected area in a buffer memory 220 and notifies the host 100 whether the data matches. However, data corresponding to a keyword is not transmitted to the host 100 during a key matching operation. This will be described below in detail.

The host 100 writes data into the storage device 200, or reads data stored in the storage device 200. The host 100 generates a command CMD to write the data into the storage device 200 or read the data stored in the storage device 200. In particular, the host 100 provides the matching key search command MD_Key CMD for accessing the data stored in the storage device 200. In this case, the host 100 receives a result value of a key matching operation on the matching key search command MD_Key CMD from the storage device 200. However, the host 100 does not receive data corresponding to a keyword and/or does not perform a key matching operation. Search-requested data may be stored in the buffer memory 220 of the storage device 200, and the key matching operation may be performed by an ISC algorithm of the storage device 200.

The host 100 includes a processing unit 110, a host memory 120, and an interface circuit 130. An application program, a file system, and a device driver may be loaded in the host memory 120 to drive the server system 10. Various software may be loaded in the host memory 120 to drive the host 100.

The processing unit 110 executes the various software (an application program, an operating system (OS), and a device driver for example) loaded in the host memory 120. The processing unit 110 executes the operating system (OS) and application programs. The processing unit 110 may be provided as a homogeneous multi-core processor or a heterogeneous multi-core processor.

An application program or data to be processed by the processing unit 110 are loaded in the host memory 120. An input/output scheduler (not shown) may be loaded in the host memory 120 to manage a queue for a command to be transmitted to the storage device 200.

The interface circuit 130 provides a physical connection between the host 100 and the storage device 200. That is, the interface circuit 130 converts a command, an address, and data corresponding to various access requests issued by the host 100 in a manner that interfaces with the storage device 200. A protocol of the interface circuit 130 may be at least one of Universal Serial Bus (USB), Small Computer System Interface (SCSI), Peripheral Component Interconnect express (PCIe), ATA, Parallel ATA (PATA), Serial ATA (SATA), and Serial Attached SCSI (SAS), or the like. However, in some embodiments of the inventive concept the interface circuit 130 may support an interface scheme having a direct load/storage function. The direct load/storage function is an interface scheme that shares memory resources of the host 100 and memory resources of the storage device 200 in the host 100. For example, when the direct load/storage function is enabled, the host 100 may manage the host memory 120 and the buffer memory 220 of the storage device 200 with a single memory map. The host 100 may access the buffer memory 220 not in a block access manner but in a byte access manner, like the manner in which the host 100 accesses the host memory 120.

The storage device 200 performing the key matching operation includes a storage controller 210, the buffer memory 220, and a plurality of nonvolatile memory devices 230, 240, and 250 connected to the storage controller 210 through memory channels CH1, CH2 and CHn.

The storage device 200 accesses nonvolatile memory devices 230, 240, and 250 and/or performs various requested operations in response to the command CMD provided from the host 100. In particular, the storage device 200 reads original data from the nonvolatile memory devices 230, 240, and 250 in response to the matching key search command MD_Key CMD. The read original data is stored in the buffer memory 220 and used in the key matching operation by the ISC function. The storage device 200 does not transmit the original data read from the nonvolatile memory devices 230, 240, and 250 to the host 100. The storage device 200 performs a key matching operation instead of the host 100 performing the key matching operation.

The storage controller 210 provides interfacing between the host 100 and the storage device 200. The storage controller 210 supports the ISC function. For example, the storage controller 210 reads the original data from the nonvolatile memory devices 230, 240, and 250 in response to the matching key search command MD_Key CMD from the host 100. The storage controller 210 stores the read original data in the buffer memory 220. The storage controller 210 performs a key matching operation on the read original data. The storage controller 210 may form a matching key table 225 in the buffer memory 220 with reference to a result of the key matching operation. The storage controller 210 may constitute a direct channel (Direct_CH) 140 for the buffer memory 220. A more detailed operation of the storage controller 210 will be described later with reference to accompanying drawings.

As described above, the storage device 200 performs the matching key search operation in response to the matching key search command MD_Key CMD from the host 100. The storage device 200 loads a result of the matching key search operation in the buffer memory 220 and enables the direct channel (Direct_CH) 140 to provide a direct load/storage function.

Figure 2:
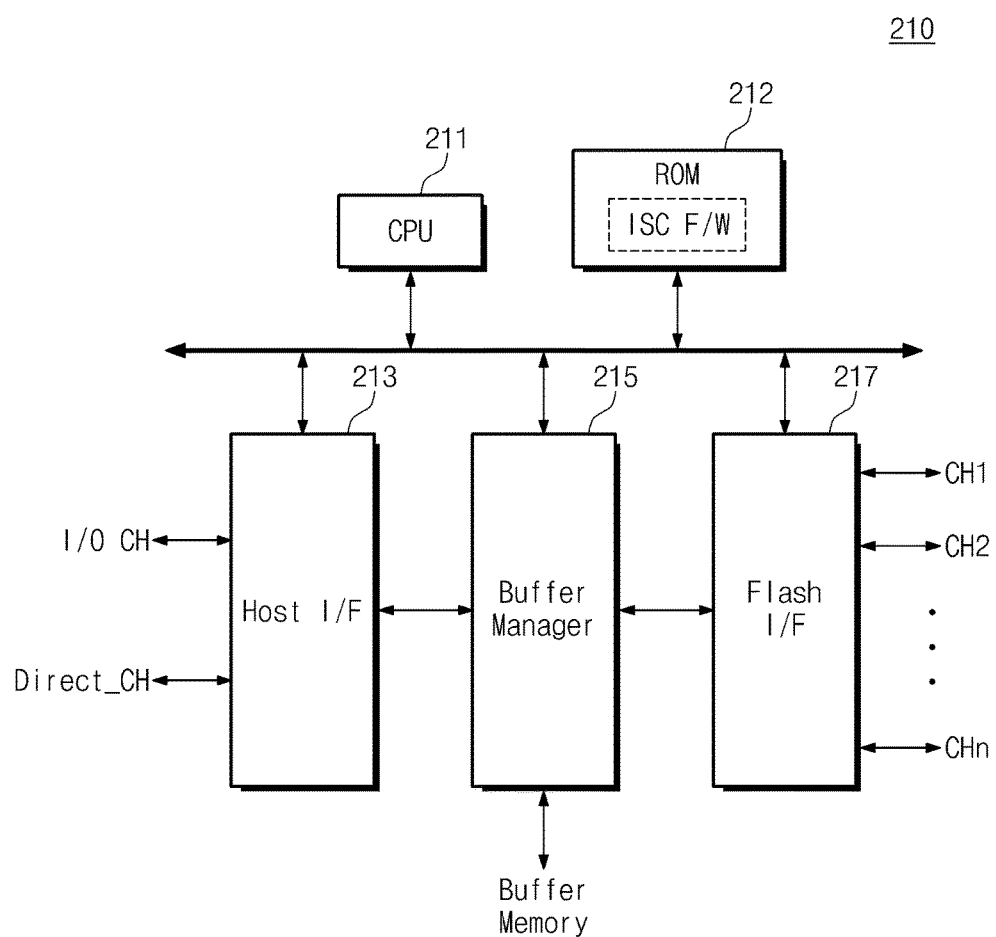
FIG. 2 illustrates a block diagram of the configuration of a storage controller in FIG. 1 according to embodiments of the inventive concept.

FIG. 2 is a block diagram illustrating a configuration of the storage controller 210 in FIG. 1 according to embodiments of the inventive concept. As illustrated, the storage controller 210 includes a central processing unit (CPU) 211, a read only memory (ROM) 212, a host interface 213, a buffer manager 215, and a flash interface 217.

The CPU 211 transmits various control information required for read/write operations of the nonvolatile memory devices 230, 240, and 250 to registers of the host interface 213 and the flash interface 217. The CPU 211 operates according to firmware provided for various control operations of the storage controller 210. For example, the CPU 211 may execute garbage collection to manage the nonvolatile memory devices 230, 240, and 250 or a flash translation layer (FTL) to perform address mapping, wear-leveling or the like. In particular, the CPU 211 may execute firmware provided from the read only memory (ROM) 212 to support an ISC function.

The host interface 213 communicates with the host 100. For example, the host interface 213 provides a channel for communication with the host 100. In particular, the host interface 213 provides a direct channel Direct_CH for allowing the host 100 to access the buffer 220 in a direct load/storage manner. The buffer memory 220 may be addressed by the host 100 through the direct channel Direct_CH in a byte access manner.

The host interface 213 provides a physical connection between the host 100 and the storage device 200. That is, the host interface 213 provides interfacing with the storage device 200 using a bus format of the host 100. The bus format of the host 100 may include at least one of Universal Serial Bus (USB), Small Computer System Interface (SCSI), Peripheral Component Interconnect express (PCIe), ATA, Parallel ATA (PATA), Serial ATA (SATA), and Serial Attached SCSI (SAS). The host interface 213 may be an interface to which an NVM express (NVMe) protocol mounted on the host 100 to exchange data in a PCI express scheme is applied.

The buffer manager 215 controls read and write operations of the buffer memory 220 (see FIG. 1). For example, the buffer manager 215 temporarily stores write data or read data in the buffer memory 220.

The flash interface 217 exchanges data with the nonvolatile memory devices 230, 240, and 250. The flash interface 217 writes data transmitted from the buffer memory 220 to the nonvolatile memory devices 230, 240, and 250 via respective memory channels CH1, CH2, . . . , and CHn. Read data transmitted from the nonvolatile memory devices 230, 240, and 250 via a memory channel are gathered by the flash interface 217. The gathered data may be stored in the buffer memory 220.

With the above-described structure, the storage controller 210 may perform a requested key matching operation in the host 100. The storage controller 210 may maintain a result of the key matching operation in the buffer memory 220 and provide the result of the key matching operation to the host 100 through the direct channel Direct_CH.

Figure 3:
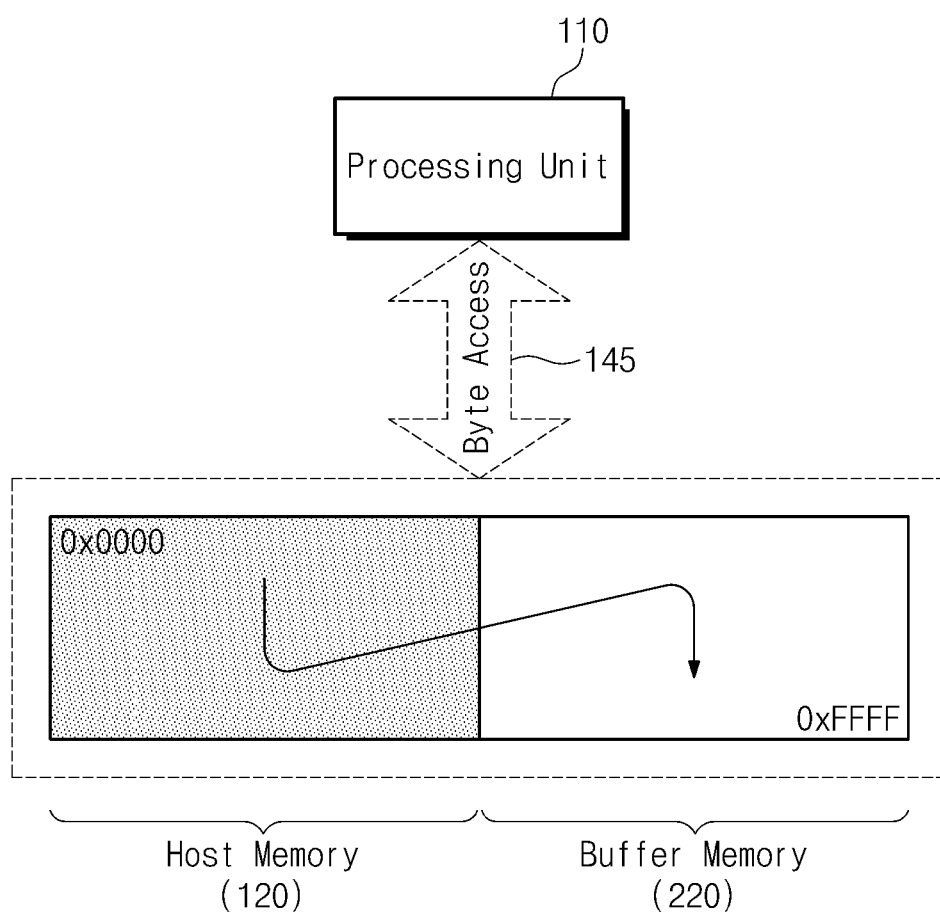
FIG. 3 illustrates a block diagram of a memory management method of a direct load/storage manner according to embodiments of the inventive concept.

FIG. 3 is a block diagram illustrating a memory management method of a direct load/storage manner according to embodiments of the inventive concept. Referring to FIG. 3, when a direct channel Direct_CH is enabled, a processing unit 110 may manage a host memory 120 and a buffer memory 220 of a storage device 200 using a single memory map.

When power is supplied to the storage device 200 or is reset, the direct channel Direct_CH of the processing unit 110 and the storage device 200 is enabled. In this case, the host 100 may use an input/output (I/O) channel for typical data exchange. The I/O channel provides a connection in a typical block addressing manner. Meanwhile, the direct channel Direct_CH provides a connection which makes byte-unit data access possible. Thus, the processing unit 110 may access the buffer memory 220 according to the same protocol as an interfacing protocol of the host memory 120.

The processing unit 110 may map and manage the host memory 120 and the buffer memory 220 with a single memory map. That is, when the direct channel Direct_CH is enabled, the processing unit 110 may manage resources of the host memory 120 and the buffer memory 220 as a single capacity resource. That is, the processing unit 110 may sequentially manage and control a start address (0x0000) of the host memory 120 through to a final address (0xFFFF) of the buffer memory 220. Thus, the processing unit 110 may secure a resource having a size obtained by adding capacities of the host memory 120 and the buffer memory 220. Moreover, the processing unit 110 may access the buffer memory 220 not according to a separate command/address set for accessing the storage device 200, but may access the buffer memory 220 according to a procedure used to access the host memory 120.

The processing unit 110 may manage the host memory 120 and the buffer memory 220 with a single memory map, and read or write data in a byte access manner. That is, the processing unit 110 may access the buffer memory 220 in a manner used to access the host memory 120. That is, the processing unit 110 may access the buffer memory 220 in the same manner as the access manner of the host memory 120 provided as a DRAM. In this case, since there is no need to follow a command sequence such as when an input/output (I/O) channel is used, the processing unit 110 may efficiently access the buffer memory 200.

Figure 4:
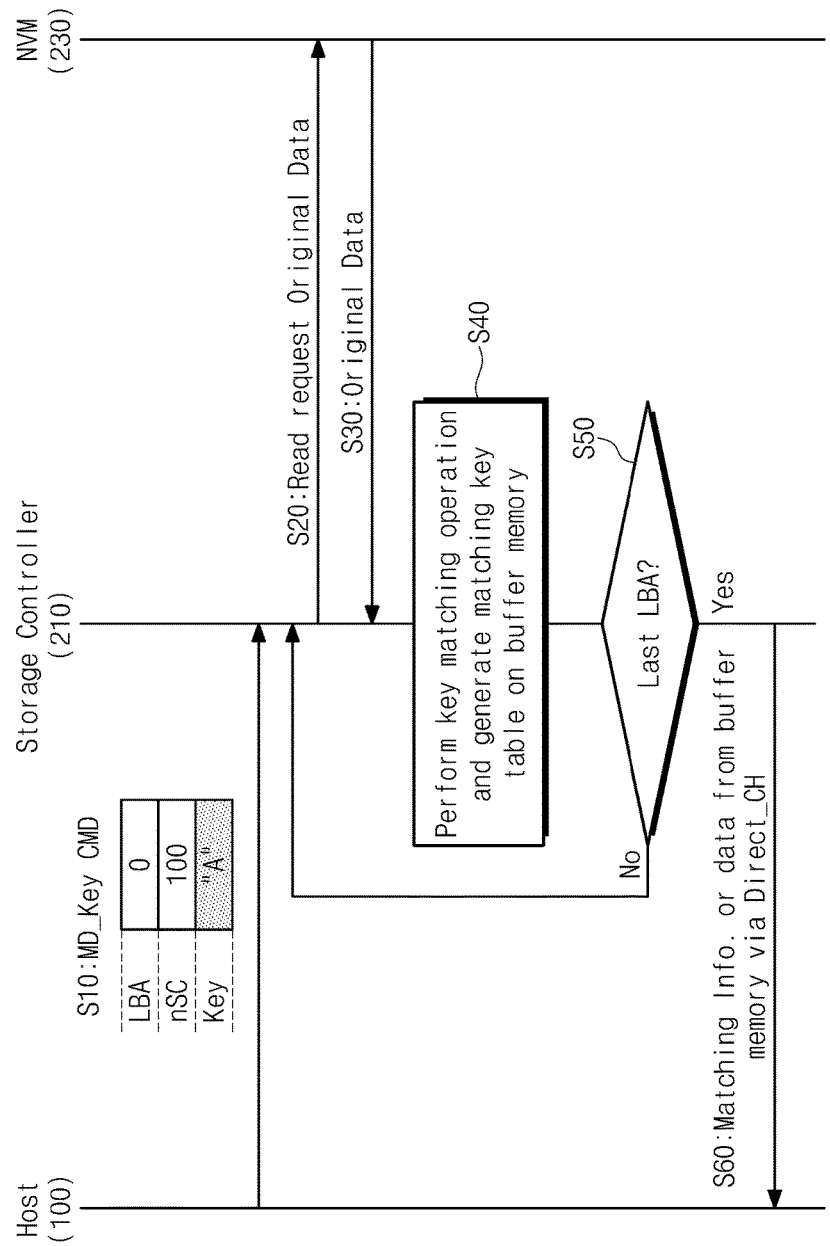
FIG. 4 illustrates a key matching management method of a server system according to embodiments of the inventive concept.

FIG. 4 illustrates a key matching management method of a server system 10 according to embodiments of the inventive concept. Referring to FIG. 4, the host 100 provides a matching key search command MD_Key CMD to the storage device 200 when a matching key search request is issued. However, a key matching operation is substantially performed in the storage device 200 to search and determine whether a matching key exists. The host 100 may read only a result of the key matching operation or search data corresponding to the result of the key matching operation from the storage device 200. This will be described below in further detail.

At S10, the host 100 provides the matching key search command MD_Key CMD to the storage device 200 when a keyword search request is issued. The keyword search request may be requested by a client or issued by a server internal operation. The matching key search command MD_Key CMD may include a search-requested keyword and an address range of the storage device 200. For example, the host 100 may provide the matching key search command MD_Key CMD as including a keyword "A", a start LBA "0", and a sector or page number nSC corresponding to the search range from the start LBA, to search for a matching key for the keyword "A".

At S20, the storage controller 210 of the storage device 200 makes a read request for original data of an area corresponding to the address range in response to the matching key search command MD_Key of the host 100. At S30, the original data is output from the nonvolatile memory device (e.g., 230). At this point, the storage controller 210 may read the original data from a partial area of the requested address range and load the read original data in the buffer memory 220.

At S40, the storage controller 210 performs a key matching operation on the data loaded in the buffer memory 220. The storage controller 210 may form a matching key table using a result of the key matching operation on the original data read from the partial area of the address range. For example, the storage controller 210 may store information to indicate whether the original data matches a key (Hit) and an address of the original data in the matching key table. The original data may be erased or maintained in the buffer memory 220 depending on whether it matches the key (Hit).

At S50, the storage controller 210 determines whether the original data on which the current matching operation is performed corresponds to the last data of the address range (that is, the last LBA of the address range). When the original data corresponds to the last data, the key matching operation is complete. Thereafter at S60, transmission of the matching information or the original data to the host 100 may be done. Meanwhile, when the original data on which the current matching operation is performed does not correspond to the last data of the address range as determined at S50, the flow may proceed to S20 to read the original data from the nonvolatile memory device 230 at a next LBA of the address range.

At S60, the storage controller 210 transmits data on key matching and matching data to the host 100. The storage controller 210 may transmit the above-mentioned data to a direct channel Direct_CH according to the request of the host 100. Alternatively, the storage controller 210 may transmit the above-mentioned data to an input/output (I/O) channel according to the request of the host 100.

A matching key search operation according to embodiments of the inventive concept has been described with respect to FIG. 4. As described, the storage device 200 may perform a key matching operation using an ISC function. A result of the key matching operation may be transmitted to the host 100 through the direct channel Direct_CH. Irrespective of whether the key matching operation is a Hit, the original data may be read only once from the nonvolatile memory device 230. Thus, the storage device 200 may efficiently share a search function to improve search efficiency of a server system even in the case of the host 100 whose performance may be degraded by the need to process a plurality of interrupts.

Figure 5:
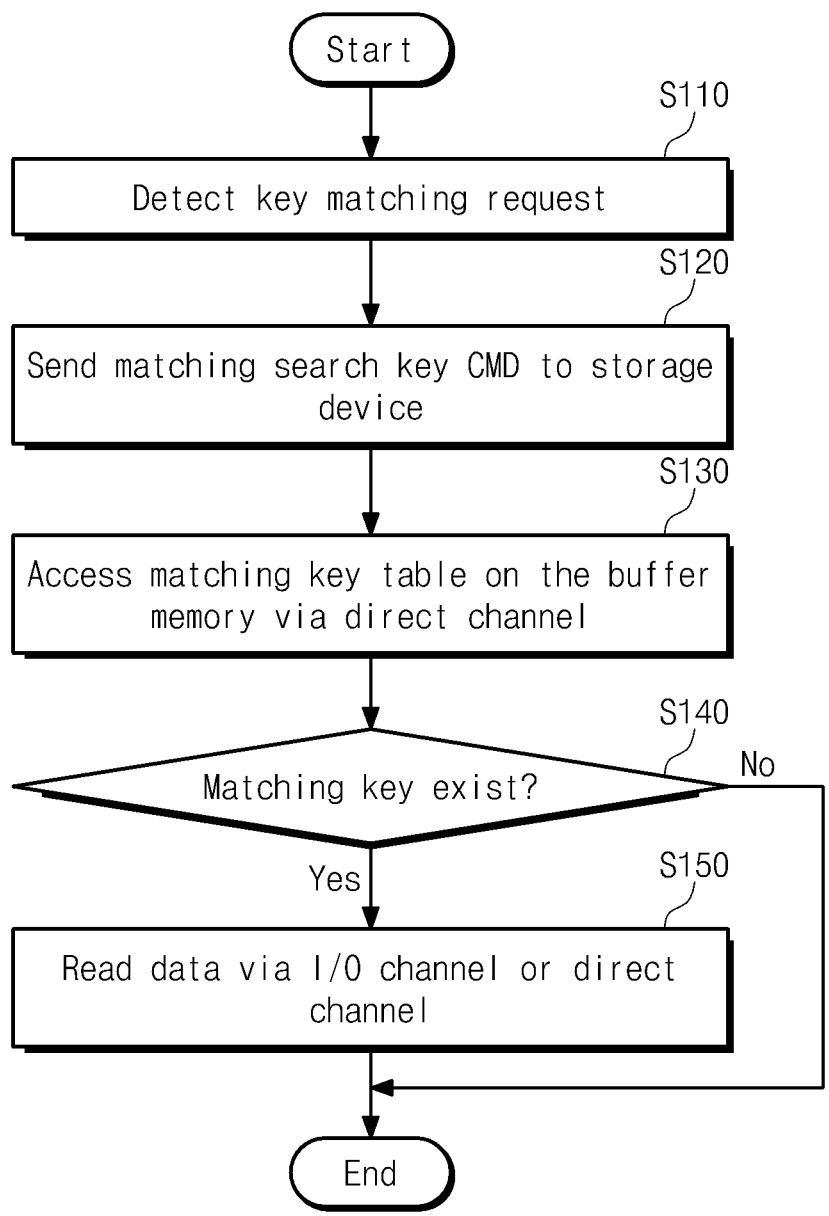
FIG. 5 illustrates a flowchart summarizing the function of a host according to embodiments of the inventive concept.

FIG. 5 illustrates a flowchart summarizing the function of the host 100 according to embodiments of the inventive concept. Referring to FIG. 5, the host 100 may share a burden of a key matching operation with a storage device 200.

At S110, the host 100 monitors issuance of a keyword matching request. The host 100 may detect a key matching request that is search-requested by a client or is additionally issued to offer various services.

At S120, the host 100 provides a matching key search command MD_Key CMD to the storage device 200. The matching key search command MD_Key CMD may include a search-requested keyword and a search address range of the storage device 200. The search address range may be memory areas of the nonvolatile memory devices 230, 240, and 250 to be searched.

At S130, the host 100 accesses a matching key table of the storage device 200 to check a result of the performed key matching operation in response to the key matching search command MD_Key CMD.

At S140, the host 100 determines whether data matching the search-requested key exists. When information matching the search-requested key does not exist in the result of the key matching operation performed by the storage device 200 (No), the overall keyword search is completed. Meanwhile, when a key requested through the matching key search command MD_Key CMD exists, the flow proceeds to S150.

At S150, the host 100 may read original data associated with a matching key or various meta data associated with the matching key through either a direct channel Direct_CH or an I/O channel.

According to the above-described operation of the host 100, a key matching operation may be delegated to the storage device 200 and the host 100 may fetch only a result of the key matching operation. Thus, the costs associated with source consumption and performance degradation resulting from data exchange when the key matching operation is performed in the host 100 may be reduced.

Figure 6:
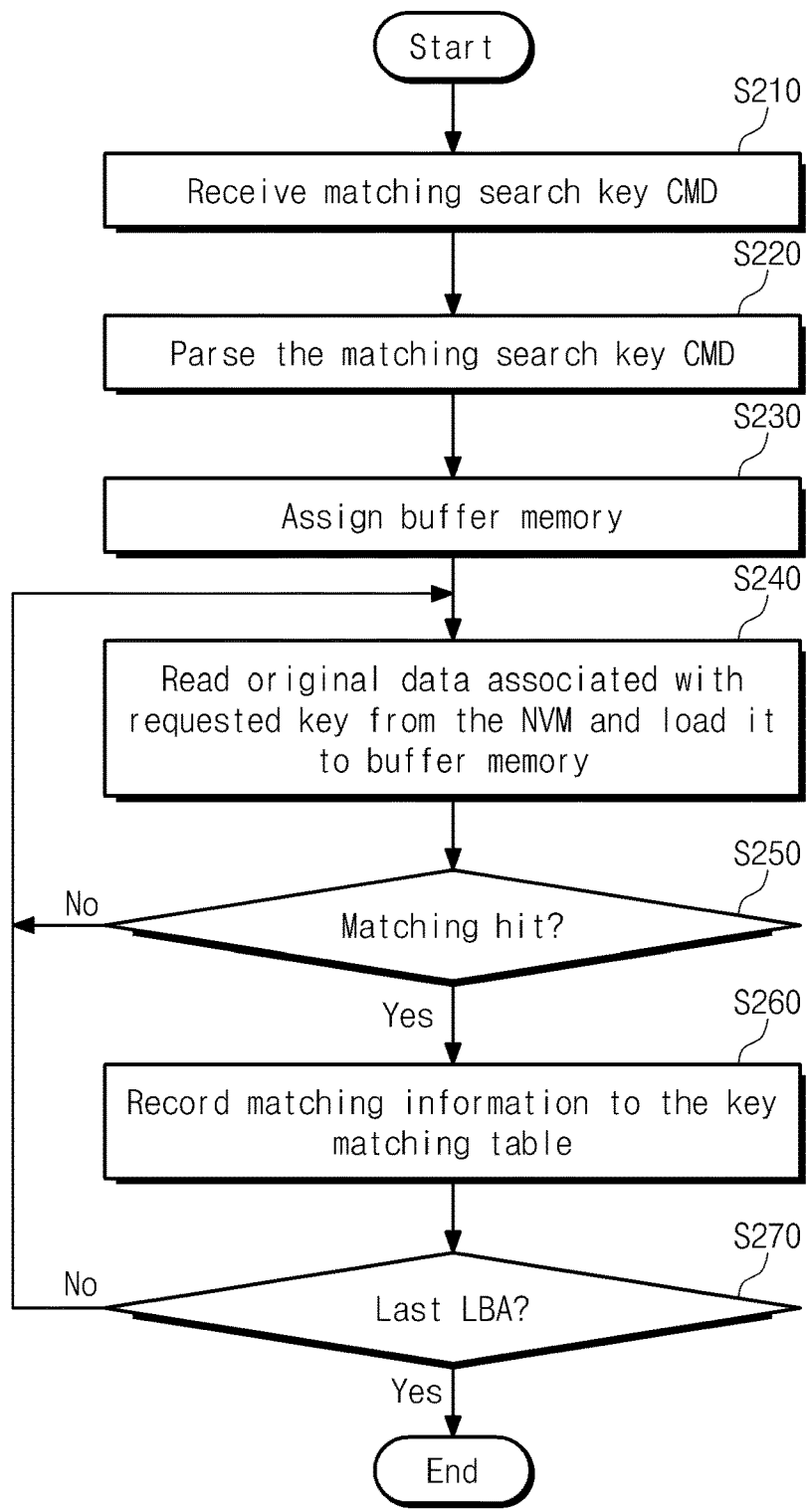
FIG. 6 illustrates a flowchart summarizing a key matching operation performed in a storage device according to embodiments of the inventive concept.

FIG. 6 illustrates a flowchart summarizing a key matching operation performed in the storage device 200 according to embodiments of the inventive concept. Referring to FIG. 6, the storage device 200 performs a key matching operation in response to a matching key search command MD_Key CMD provided from the host 100. A result of the key matching operation may be provided to an input/output (I/O) channel or via a direct channel Direct_CH according to a request of the host 100.

At S210, the storage device 200 receives a matching key search command MD_Key CMD from the host 100. The matching key search command MD_Key CMD may be provided through an administer command CMD of the I/O channel.

At S220, the storage device 200 analyzes the matching key search command MD_Key CMD provided as an administer command. For example, the storage device 200 checks an address range over which to perform the key matching operation and extracts a keyword that is a target of the key matching operation. The storage device 200 may determine the overall procedures necessary to execute the matching key search command MD_Key CMD.

At S230, the storage device 200 assigns an area of the buffer memory 200 to execute the matching key search command MD_Key CMD. The storage device 200 may assign an area to load data from the address range provided through the matching key search command MD_Key CMD and areas to load the result of the key matching operation on a corresponding area. In addition, the storage device 200 may set the corresponding area such that the corresponding area is accessed in the host 100 through the direct channel Direct_CH.

At S240, the storage device 200 reads some of the data of the address range from nonvolatile memory devices 230, 240, and 250 through the matching key search command MD_Key CMD. The data loaded from the nonvolatile memory devices 230, 240, and 250 is loaded in the buffer memory 220.

At S250, a key matching operation is performed to match the data loaded in the buffer memory 220 with the search-requested keyword. When, among the loaded data, data matching the keyword does not exist (No), the flow returns to S240 and the storage device 200 reads other data of the address range of the nonvolatile memory devices 230, 240, and 250. Meanwhile, when the loaded data matching the keyword exists (Yes), the flow proceeds to S260.

At S260, the storage device 200 stores the result of the key matching operation on the loaded data in the buffer memory 220. For example, the storage device 200 may form a matching key table to write information on whether a corresponding address range results in a hit and an address of hit data in the matching key table.

At S270, the storage device determines whether data on which a current key matching operation is performed corresponds to the last address of the address range (that is, the last LBA of the address range). When the data on which the key matching operation is performed is determined to be the last address of the address range provided from the matching key search command MD_Key CMD, the flow is completed. Meanwhile, when the data on which the key matching operation is performed is not determined as the last address of the address range provided through the matching key search command MD_Key CMD, the flow returns to S240 to read some of the other data of the address range.

A procedure of a key matching operation using an ISC function performed by the storage device 200 according to embodiments of the inventive concept has been described with respect to FIG. 6. The host 100 may access a key matching table formed in the buffer memory to perform various operations when or after the key matching operation is performed. It should be understood that the host 100 may access the buffer memory 220 through the direct channel Direct_CH.

Figure 7:
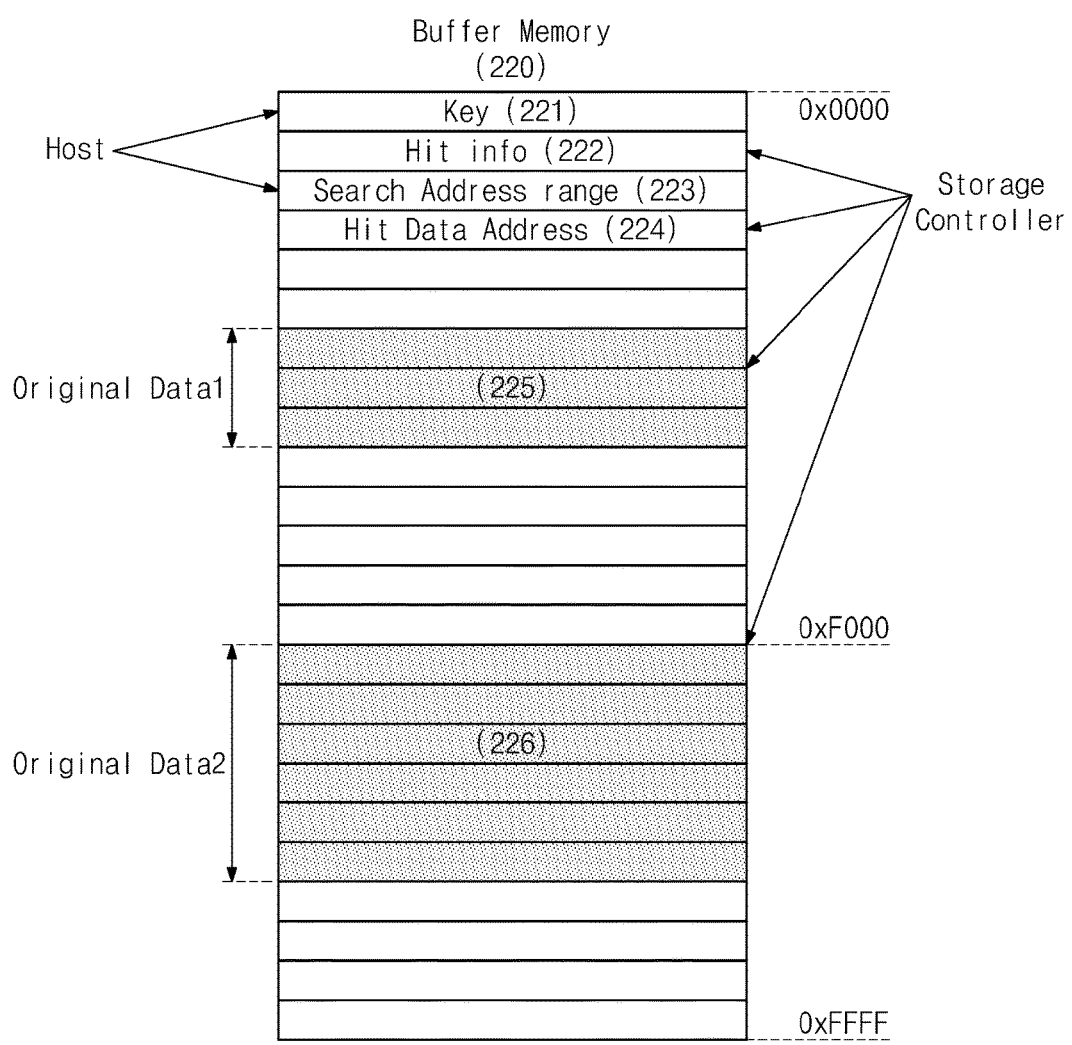
FIG. 7 illustrates a storage space of a buffer memory that is assigned in a storage device in response to a matching key search command according to embodiments of the inventive concept.

FIG. 7 illustrates a storage space of a buffer memory 220 that is assigned in a storage device 200 in response to a matching key search command MD_Key CMD according to embodiments of the inventive concept. Referring to FIG. 7, a provided keyword 221, matching hit information 222, a search address range 223, a matching data address 224, and original data 225 and 226 may be stored in the buffer memory 220. An example will be described where a memory area allocated to the buffer memory 220 in response to the matching key search command MD_Key CMD is '0x0000~0xF000'. Hereinafter, the memory area allocated to the buffer memory 220 will be referred to as an allocated area.

The keyword 221 and the search address range 223 may be generated as a parsing result of the provided matching key search command MD_Key CMD. The storage controller 210 may store the keyword 221 and the search address range 223 provided from the host 100 in an allocated area of the buffer memory 220.

The storage controller 210 accesses nonvolatile memory devices 230, 240, and 250 with reference to the search address range 223. The storage controller 210 may perform a read operation on some or all areas of the search address range 223. The original data read from the nonvolatile memory devices 230, 240, and 250 by the storage controller 210 may be stored in an assigned area 225 of the buffer memory 220. When a size of the original data to be read from the nonvolatile memory devices 230, 240, and 250 for the search cannot be accepted within a memory size of the allocated area (0x0000~0xF000), the storage controller 210 may adjust a size of the allocated area. Original data Original Data2 subsequent to original data Original Data1 may be newly stored in assigned area 226. Link information of the original data Original Data1 and Original Data2 may be stored in a specific location of the buffer memory 220.

When loading the original data Original Data1 and loading the original data Original Data2 in the buffer memory 220 are complete, the storage controller 210 may perform a key matching operation using an ISC function. The storage controller 210 may perform a compare or search operation to determine whether information matching a keyword provided from the host 100 exists in the original data Original Data1 or Original Data2. When the information matching a keyword provided from the host 100 exists in the original data, the storage controller 210 may update hit information 222 as a bit value to indicate that the matching information exists. In addition, the storage controller 210 may update accurate address information or link information on the original data to a hit data address 224.

However, the result of the matching operation may be that information matching the keyword provided from the host 100 does not exist in the original data Original Data1 or Original Data2. In this case, the storage controller 210 may write the hit information 222 as a bit value to indicate that matching information does not exist. The storage controller 210 may perform a process to erase or delete the original data Original Data1 or Original Data2 loaded in the buffer memory 220.

It should be understood that the original data Original Data1 or Original Data2 loaded in the buffer memory 220 may be deleted to enhance management efficiency of the storage device 200 even when information matching the keyword exists. For example, the original data Original Data1 or Original Data2 may be erased from the buffer memory 200 depending on a size of available memory, a wear-level size of the nonvolatile memory devices 230, 240, and 250 or whether a background operation of the like performed in the storage device 200 is enabled. A processing level of the original data Original Data1 or Original Data2 will be described below in detail with reference to FIG. 8.

Figure 8:
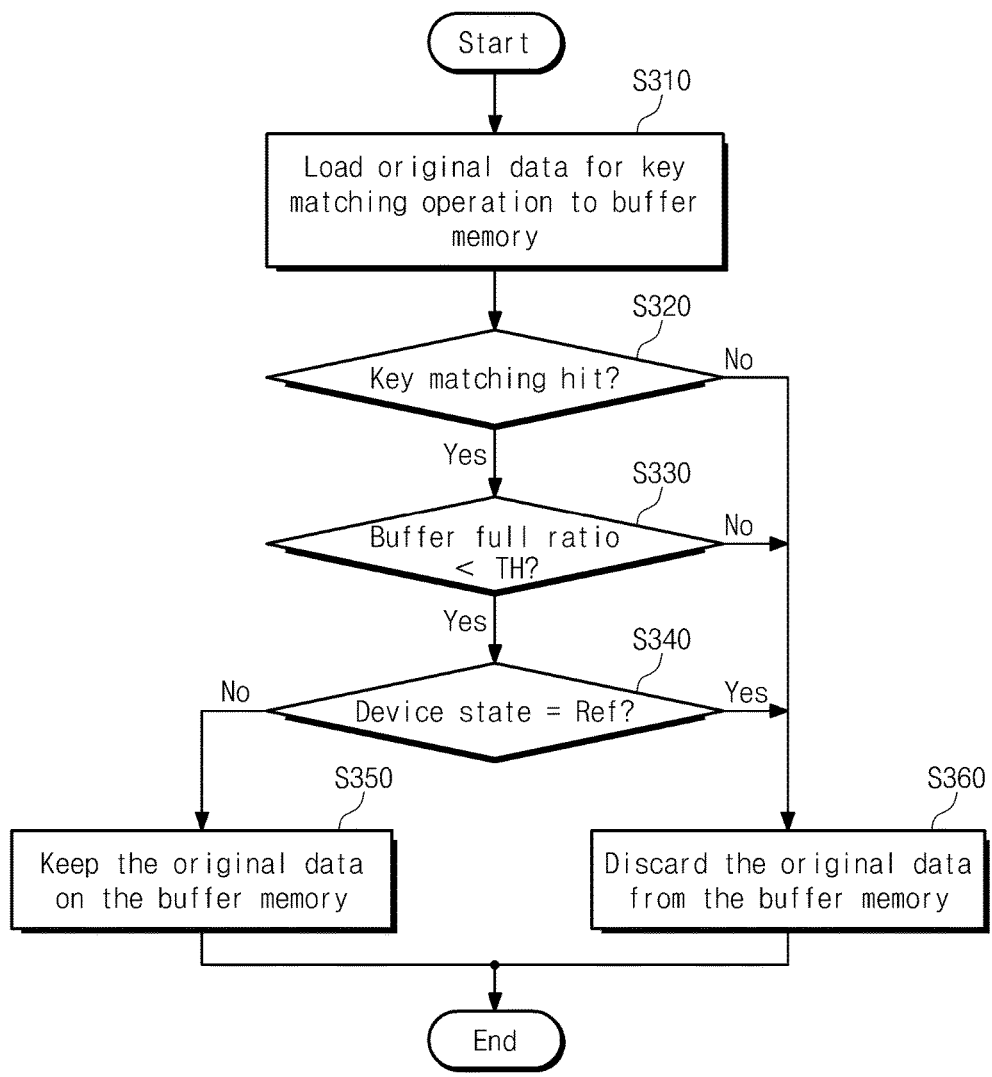
FIG. 8 illustrates a flowchart summarizing a method for processing original data loaded in a buffer memory according to embodiments of the inventive concept.

FIG. 8 illustrates a flowchart summarizing a method for processing original data loaded in the buffer memory 220 according to embodiments of the inventive concept. Referring to FIG. 8, the storage controller 210 may maintain or erase original data in or from the buffer memory 220 depending on not only a result of a key matching operation but also various conditions.

At S310, the storage controller 210 reads original data from a certain area (nonvolatile memory area) of an address range in response to a key matching search command MD_Key CMD. The read original data is loaded in an assigned area of the buffer memory 220.

At S320, the storage controller 210 performs a key matching operation. The storage controller 210 compares a keyword provided from the host 100 with the original data using an ISC function. When information matching the keyword exists in the original data (Yes), the flow proceeds to S330. On the other hand, when information matching the keyword does not exist in the original data (No), the flow proceeds to S360 to delete the original data.

At S330, the storage controller 210 determines whether the original data is to be maintained depending on a full ratio of the buffer memory 220. Stream data or metadata exchanged between the host 100 and the nonvolatile memory devices 230, 240, and 250 may be stored in the buffer memory 220. The storage controller 210 may process the original data read for the key matching operation with reference to a state of the buffer memory 220. If the buffer full ratio of the buffer memory 220 is lower than a threshold TH (Yes), the flow proceeds to S340. Meanwhile, when the buffer full ratio of the buffer memory 220 is higher than or equal to the threshold TH (No), the flow proceeds to S360 to delete the original data.

At S340, the storage controller 210 detects a device state of the storage device 200 and processes the original data according to the detected device state. The device state may include data on whether a background operation of the storage device 200 is performed or enabled, a wear-leveling condition of the nonvolatile memory devices 230, 240, and 250, and a size of accumulated command queues. When the device state is equivalent to a set reference Ref (Yes), the flow proceeds to S360 to delete the original data. Meanwhile, when the device state is not equivalent to the set reference Ref (No), the flow proceeds to S350.

At S350, the storage controller 210 maintains the original data loaded in the buffer memory 220. The storage controller 100 may block erasure or deletion of the original data loaded in the buffer memory 220 until the original data is read-requested from the host 100.

At S360, the storage controller 210 erases the original data loaded in the buffer memory 220. In particular, when the original data loaded in the buffer memory 220 does not match a keyword, an address 224 of the matching data stored in the buffer memory 220 may also be erased. Meanwhile, when the original data loaded in the buffer memory 220 matches the keyword, the address 224 of the matching data stored in the buffer memory 220 is not erased and is maintained.

A method for processing original data loaded in the buffer memory 220 has been described. The step S330 to process the original data according to a state of the buffer memory and the step S340 to process the original data according to a device state are merely exemplary. That is, it will be understood that the steps S330 and S340 may be interchangeable or may be performed in parallel at the same time.

Figure 9:
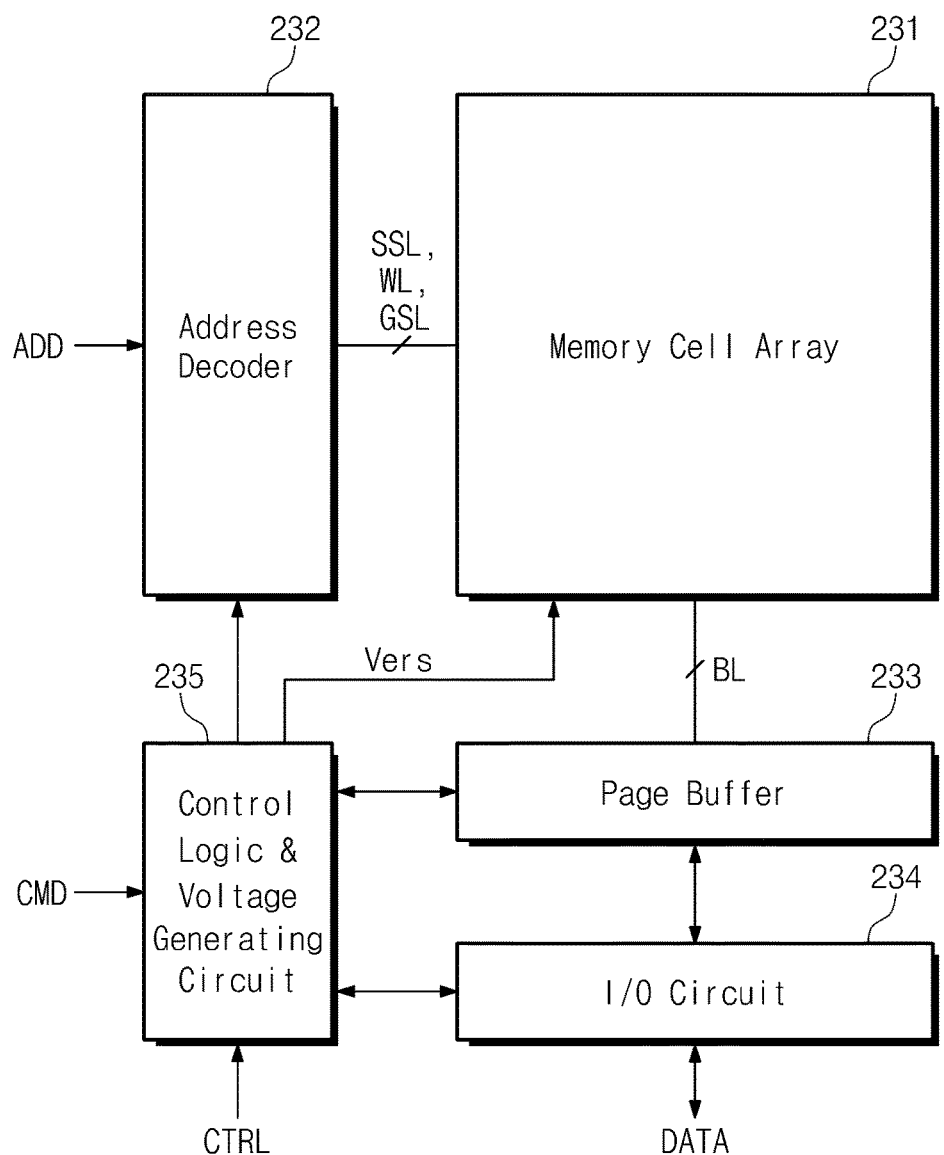
FIG. 9 illustrates a block diagram of a configuration of the nonvolatile memory device described in FIG. 1 according to embodiments of the inventive concept.

FIG. 9 illustrates a block diagram of a configuration of the nonvolatile memory device 230 described in FIG. 1 according to embodiments of the inventive concept. The nonvolatile memory device 230 will be described with respect to operations and functions as representative of the nonvolatile memory devices 230, 240, and 250. As illustrated, the nonvolatile memory device 230 includes a memory cell array 231, an address decoder 232, a control logic and voltage generating circuit 235, a page buffer 233, and an input/output (I/O) circuit 234.

The memory cell array 231 includes a plurality of memory blocks. Each of the memory blocks includes a plurality of cell strings. Each of the cell strings includes a plurality of memory cells. The memory cells are connected to a plurality of wordlines WL, respectively. Each of the memory cells may include a single-level cell (SLC) storing a single bit or a multi-level cell (MLC) storing at least two bits.

The address decoder 232 is connected to the memory cell array 231 through a plurality of wordlines WL, at least one string selection line SSL, and at least one ground selection line GSL. The address decoder 232 receives a physical address ADD from an external device (e.g., storage controller 210) and decodes the received physical address ADDR to drive the wordlines WL. For example, the address decoder 232 may decode the physical address ADDR received from the external device, select at least one of the wordlines WL based on the decoded physical address ADD, and drive the selected at least one wordline.

The control logic and voltage generating circuit 235 receives write and read commands CMD and a control signal CTRL from the external device. The control logic and voltage generating circuit 235 controls the address decoder 232, the page buffer 233, and the I/O circuit 234 in response to the received signals. For example, the control logic and voltage generating circuit 235 may control the components to store data DATA from the external device in the memory cell array 231 in response to the signals CMD and CTRL. Alternatively, the control logic and voltage generating circuit 235 may control the components to transmit the data DATA stored in the memory cell array 231 to the external device in response to the signals CMD and CTRL.

The page buffer 233 is connected to the memory cell array 231 through a plurality of bitlines BL. The page buffer 233 may control the bitlines to store the data DATA received from the I/O circuit 234 in the memory cell array 231 according to the control of the control logic and voltage generating circuit 235. The page buffer 233 may read the data stored in the memory cell array 231 and transmit the read data to the I/O circuit 234 according to the control of the control logic and voltage generating circuit 235. In example embodiments, the page buffer 233 may receive data from the I/O circuit 234 in units of pages or read data from the memory cell array 231 in units of pages.

The I/O circuit 234 may receive data DATA from the external device and transmit the received data DATA to the page buffer 233. Alternatively, the I/O circuit 234 may receive data DATA from the page buffer 233 and transmit the received data DATA to the external device. In example embodiments, the I/O circuit 234 may transmit/receive data DATA to/from the external device in synchronization with the control signal CTRL.

The control logic and voltage generating circuit 235 may generate various voltages required to operate the nonvolatile memory 230. For example, the control logic and voltage generating circuit 235 may generate various voltages such as a plurality of program voltages, a plurality of pass voltages, a plurality of select read voltages, a plurality of unselect read voltages, a plurality of erase voltages such as Vers applied to memory cell array 231, and a plurality of verify voltages. The control logic and voltage generating circuit 235 may provide the various generated voltages to the address decoder 232 or a substrate of the memory cell array 231.

Figure 10:
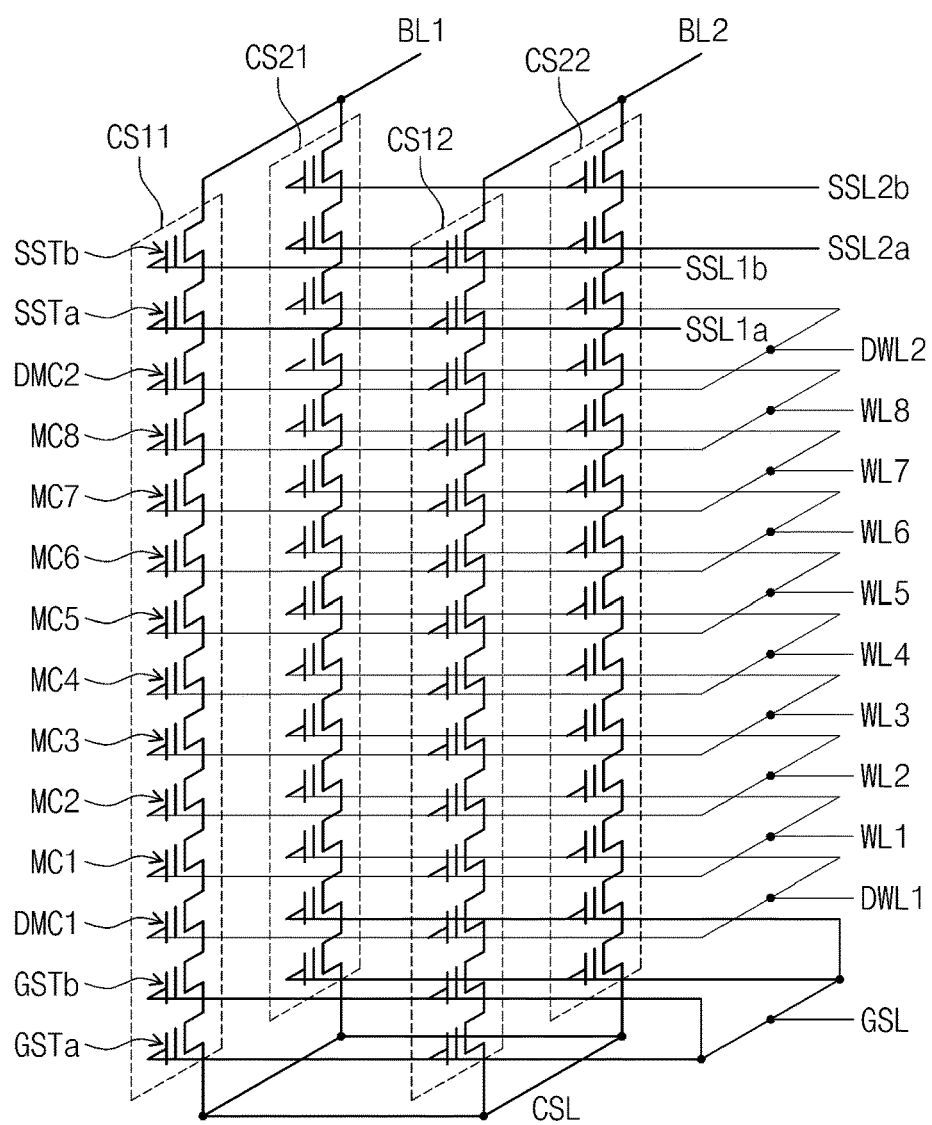
FIG. 10 illustrates a circuit diagram of an example of a first memory block among memory blocks included in a memory cell array in FIG. 9 according to embodiments of the inventive concept.

FIG. 10 illustrates a circuit diagram of an example of a first memory block BLK1 among memory blocks included in the memory cell array 231 in FIG. 9 according to embodiments of the inventive concept. The first memory block BLK1 having a three-dimensional structure will be described with reference to FIG. 10. However, embodiments of the inventive concept are not limited to the first memory block BLK1 having a three-dimensional structure, and each of memory blocks included in a nonvolatile memory may have a similar structure to the first memory block BLK1.

Referring to FIG. 10, the memory block BLK1 includes a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 may be connected to string selection lines SSL1a and SSL1b to form a first row. The cell strings CS21 and CS22 may be connected to string selection lines SSL2a and SSL2b to form a second row.

For example, the cell strings CS11 and CS21 may be connected to a first bitline BL1 to form a first column, and the cell strings CS12 and CS22 may be connected to a second bitline BL2 to form a second column.

Each of the cell strings CS11, CS12, CS21, and CS22 may include a plurality of cell transistors. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2.

In example embodiments, each of cell transistors included in the cell strings CS11, CS12, CS21, and CS22 may be charge trap flash (CTF) memory cells.

The memory cells MC1 to MC8 are serially connected and are stacked in a height direction perpendicular to a plane formed by a row direction and a column direction. The string selection transistors SSTa and SSTb are connected in series, and the serially connected string selection transistors SSTa and SSTb are provided between the memory cells MC1 to MC8 and a bitline BL. The ground selection transistors GSTa and GSTb are serially connected, and the serially connected ground selection transistors GSTa and GSTb are provided between the memory cells MC1 to MC8 and a common source line CSL.

In example embodiments, the first dummy cell DMC1 may be provided between the memory cells MC1 to MC8 and the ground selection transistors GSTa and GSTb. In example embodiments, the second dummy memory cell DMC2 may be provided between the memory cells MC1 to MC8 and the string selection transistors SSTa and SSTb.

The ground selection transistors GSTa and GSTb of the cell strings CS11, CS12, CS21, and CS22 may be commonly connected to a ground selection line GSL.

In example embodiments, although not shown in FIG. 10, ground selection transistors of the same row may be connected to the same ground selection line and ground selection transistors of different rows may be connected to different ground selection lines. For example, first ground selection transistors GSTa of cell strings CS11 and CS12 of a first row may be connected to a first ground selection line, and first ground selection transistors GSTa of cell strings CS21 and CS22 of a second row may be connected to a second ground selection line.

In example embodiments, although not shown in FIG. 10, ground selection transistors provided at the same height from a substrate (not shown) may be connected to the same ground selection line, and ground selection transistors provided at different heights from the substrate may be connected to different ground selection lines. For example, the first ground selection transistors GSTa of the cell strings CS11, CS12, CS21, and CS22 may be connected to a first ground selection line, and the second ground selection transistors GSTb thereof may be connected to a second ground selection line.

Memory cells at the same height from the substrate (or the ground selection transistors GSTa and GSTb) are commonly connected the same wordline, and memory cells at different heights are connected to different wordlines. For example, memory cells MC1 to MC8 of the cell strings CS11, CS12, CS21, and CS22 are commonly connected to first to eighth wordlines WL1 to WL8, respectively.

Among the first string selecting transistors SSTa at the same height, string selection transistors of the same row are connected to the same string selection line and string selection transistors of different rows are connected to different string selection lines. For example, first string selection transistors SSTa of the cell strings CS11 and CS12 of the first row are commonly connected to the string selection line SSL1a, and first string selection transistors SSTa of the cell strings CS21 and CS22 of the second row are commonly connected to the string selection line SSL2a.

Similarly, among the second string selecting transistors SSTb at the same height, string selection transistors of the same row are connected to the same string selection line and string selection transistors of different rows are connected to different string selection lines. For example, second string selection transistors SSTb of the cell strings CS11 and CS12 of the first row are commonly connected to the string selection line SSL1b, and second string selection transistors SSTb of the cell strings CS21 and CS22 of the second row are commonly connected to the string selection line SSL2b.

Although not shown in FIG. 10, string selection transistors of cell strings of the same row may be connected to the same string selection line. For example, first and second string selection transistors SSTa and SSTb of the cell strings CS11 and CS12 of the first row may be commonly connected to the same string selection line. The cell strings CS21 and CS22 and the first and second string selection transistors SSTa and SSTb of the second row may be commonly connected to the same string selection line.

In example embodiments, dummy memory cells at the same height are connected commonly to a same dummy wordline, and dummy memory cells of different heights are connected to different wordlines. For example, first dummy memory cells DMC1 are connected to a first dummy wordline DWL1, and second dummy memory cells DMC2 are connected to a second dummy wordline DWL2.

In the first memory block BLK1, read and write operations may be performed in units of rows. For example, a single row of a memory block BLKa may be selected by the string selection lines SSL1a, SSL1b, SSL2a, and SSL2b.

For example, when the string selection lines SSL1a and SSL1b are supplied with a turn-on voltage and the string selection lines SSL2a and SSL2b are supplied with a turn-off voltage, the cell strings CS11 and CS12 of the first row are connected to the bitlines BL1 and BL2. When the string selection lines SSL2a and SSL2b are supplied with a turn-on voltage and the string selection lines SSL1a and SSL1b are supplied with a turn-off voltage, the cell strings CS21 and CS22 of the second row are connected to the bitlines BL1 and BL2 to be driven. Among memory cells of a cell string of a row driven by driving a wordline, memory cells of the same height are selected. Read and write operations may be performed on the selected memory cells. The selected memory cells may form a physical page unit.

In the first memory block BLK1, an erase operation may be performed in units of memory blocks or sub-blocks. When an erase operation is performed in units of memory blocks, all memory cells MC of the first memory block BLK1 are simultaneously erased according to a single erase request. When an erase operation is performed in units of sub-blocks, some of memory cells MC of the first memory block BLK1 are simultaneously erased according to a single erase request and other memory cells MC of the first memory block BLK1 are erase-inhibited. A wordline connected to memory cells to be erased may be supplied with a low voltage (e.g., ground voltage), and a wordline connected to erase-inhibited memory cells may be floated.

The first memory block BLK1 shown in FIG. 10 is merely exemplary, the number of cell strings may increase or decrease, and the number of rows and columns constituted by cell strings may increase or decrease according to the number of the cell strings. Moreover, the number of cell transistors GST, MC, DMC, SST, and the like of the first memory block BLK1 may increase or decrease, and height of the first memory block BLK1 may increase or decrease according to the number of the cell transistors. The number of lines (GSL, WL, DWL, SSL, etc.) connected to the cell transistors may increase or decrease according to the number of the cell transistors.

Figure 11:
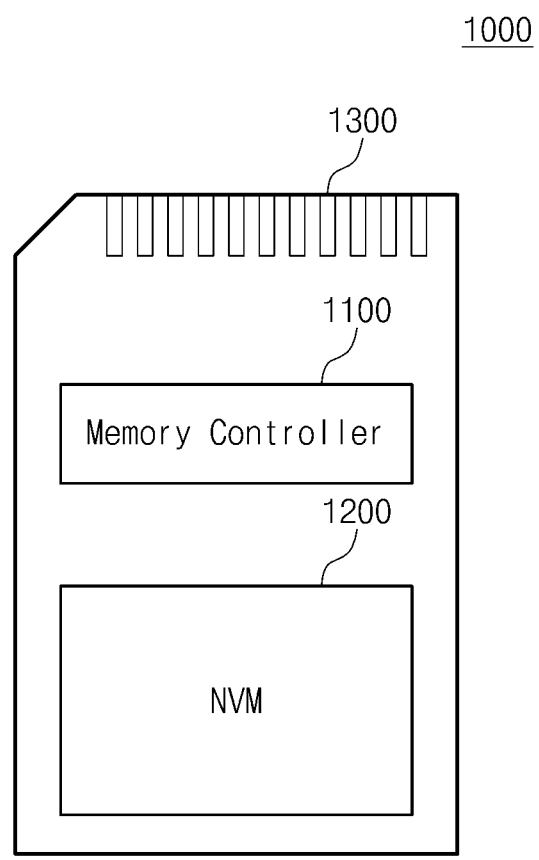
FIG. 11 illustrates a block diagram of a memory card system to which a nonvolatile memory system according to embodiments of the inventive concept is applied.

FIG. 11 illustrates a block diagram of a memory card system 1000 to which a nonvolatile memory system according to embodiments of the inventive concept may be applied. As illustrated, the memory card system 1000 includes a controller 1100, a nonvolatile memory 1200, and a connector 1300.

The controller 1100 is connected to the nonvolatile memory 1200. The controller 1100 is configured to access the nonvolatile memory 1200. For example, the controller 1100 is configured to control read, write, erase, and background operations. The background operations may include operations such as wear-leveling and garbage collection. In example embodiments, the controller 1100 may perform a requested key matching operation in response to a request from a host (not shown) based on the key matching management methods described with reference to FIGS. 1 to 8.

The controller 1100 is configured to provide an interface between the nonvolatile memory 1200 and the host. The controller 1100 is configured to drive firmware for controlling the nonvolatile memory 1200. The controller 1100 may include components such as a random access memory (RAM), a processing unit, a host interface, a memory interface, and an error correction unit.

The controller 1100 may communicate with an external device through the connector 1300. The controller 1100 may communicate with an external device (e.g., host) using a specific interface protocol. In example embodiments, the controller 1100 is configured to communicate with an external device using at least one of various interface protocols such as Universal Serial Bus (USB), multimedia card (MMC), eMMC (embedded MMC), peripheral component interconnection (PCI), PCI-express (PCIe), Advanced Technology Attachment (ATA), Serial ATA (SATA), Parallel ATA (PATA), Small Computer System Interface (SCSI), Enhanced Small Disk Interface (ESDI), Integrated Drive Electronics (IDE), Firewire, Universal Flash Storage (UFS), and Nonvolatile Memory express (NVMe). In example embodiments, a write command defined by the above interface protocols may include size information of write data.

The nonvolatile memory 1200 may be implemented with various nonvolatile memory devices such as electrically erasable and programmable ROM (EPROM), NAND flash memory, NOR flash memory, phase-change RAM (PRAM), resistive RAM (ReRAM), ferroelectric RAM (FRAM), and spin-torque magnetic RAM (STT-MRAM).

In example embodiments, the controller 1100 and the nonvolatile memory 1200 may be integrated into a single semiconductor device. In example embodiments, the controller 1100 and the nonvolatile memory 1200 may be integrated into a single semiconductor device to constitute a solid state drive (SSD). The controller 1100 and the nonvolatile memory 1200 may be integrated into a single semiconductor device to constitute a memory card. For example, the controller 1100 and the nonvolatile memory 1200 may be integrated into a single semiconductor device to constitute a memory card such as a personal computer memory card international association (PCMCIA), a compact flash card (CF), a smart media card (SM, SMC), a memory stick, a multimedia card (MMC, RS-MMC, and MMCmicro), a SD card (SD, miniSD, and microSD), and a universal flash memory device (UFS).

Figure 12:
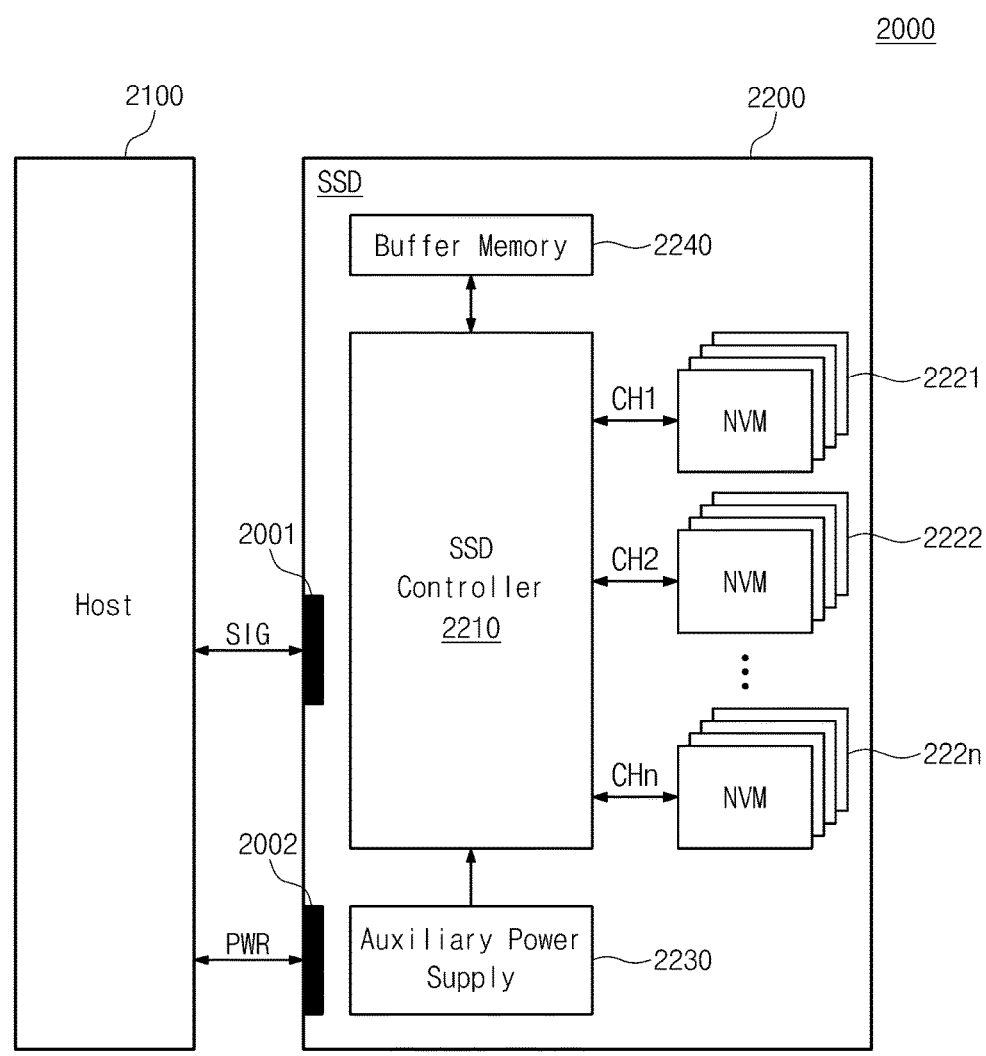
FIG. 12 illustrates a block diagram of a solid state drive (SSD) system to which a nonvolatile memory system according to embodiments of the inventive concept is applied.

FIG. 12 illustrates a block diagram of a solid state drive (SSD) system 2000 to which a nonvolatile memory system according to embodiments of the inventive concept may be applied. As illustrated, the SSD system 2000 includes a host 2100 and an SSD 2200. The SSD 2200 transmits/receives a signal SIG to/from the host 2100 through a signal connector 2001 and is supplied with power PWR through a power connector 2002. The SSD 2200 includes an SSD controller 2210, a plurality of flash memories 2221 to 222n, an auxiliary power supply 2230, and a buffer memory 2240.

The SSD controller 2210 controls the flash memories 2221 to 222n in response to the signal SIG received from the host 2100. In example embodiments, the SSD controller 2210 may perform a requested key matching operation in response to a request from the host 2100 based on the key matching management methods described with reference to FIGS. 1 to 8.

The auxiliary power supply 2230 is connected to the host 2100 through the power connector 2002. The auxiliary power supply 2230 may be supplied with the power PWR from the host 2100. The auxiliary power supply 2230 may supply power of the SSD system 2000 when power is not sufficiently supplied from the host 2100. In example embodiments, the auxiliary power supply 2230 may be disposed inside or outside the SSD 2200. For example, the auxiliary power supply 2230 may be disposed on a mainboard and may supply auxiliary power to the SSD 2200.

The buffer memory 2240 operates as a buffer memory of the SSD 2200. For example, the buffer memory 2240 may temporarily store data received from the host 2100 or data received from the flash memories 2221 to 222n, or may temporarily store metadata (e.g., mapping table) of the flash memories 2221 to 222n. The buffer memory 2240 may include a nonvolatile memory such as DRAM, SDRAM, double data rate (DDR) SDRAM, low power double data rate (LPDDR) SDRAM, and SRAM and nonvolatile memories such as FRAM, ReRAM, STT-MRAM, and PRAM.

Figure 13:
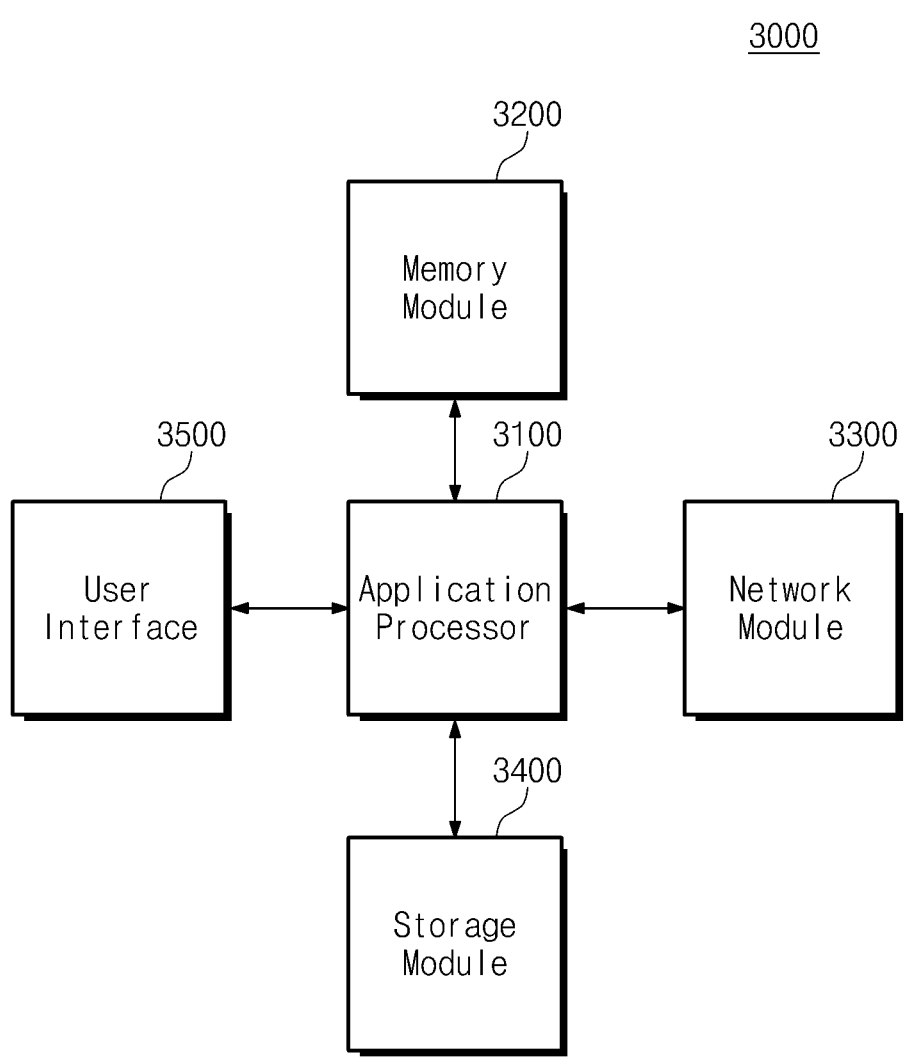
FIG. 13 illustrates a block diagram of a user system to which a nonvolatile memory system according to embodiments of the inventive concept is applied.

FIG. 13 illustrates a block diagram of a user system 3000 to which a nonvolatile memory system according to embodiments of the inventive concept may be applied. As illustrated, the user system 3000 includes an application processor 3100, a memory module 3200, a network module 3300, a storage module 3400, and a user interface 3500.

The application processor 3100 may drive components included in the user system 3000 and an operating system (OS). In example embodiments, the application processor 3100 may include controllers to control the components included in the user system 3000, interfaces, and a graphic engine. The application processor 3100 may be provided as a system-on-chip (SoC).

The memory module 3200 may operate as a main memory, a working memory, a buffer memory or a cache memory of the user system 3000. The memory module 3200 may include a volatile random access memory such as DRAM, SDRAM, DDR SDRAM, DDR2 SDRAM, DDR3 SDRAM, LPDDR SDRAM, LPDDR2 SDRAM, and LPDDR3 SDRAM or a nonvolatile random access memory such as PRAM, ReRAM, MRAM, and FRAM.

The network module 3300 may communicate with external devices. For example, the network module 3300 may support wireless communication protocols such as Code Division Multiple Access (CDMA), Global System for Mobile communication (GSM), wideband CDMA (WCDMA), CDMA-2000, Time Division Multiple Access (TDMA), Long Term Evolution (LTE), Worldwide Interoperability for Microwave Access (Wimax), wireless local area network (WLAN), Ultra-wideband (UWB), Bluetooth, and Wireless Display (WI-DI). In example embodiments, the network module 3300 may be included in the application processor 3100.

The storage module 3400 may store data. For example, the storage module 3400 may store data received from the application processor 3100. Alternatively, the storage module 3400 may transmit data stored in the storage module 3400 to the application processor 3100. In example embodiments, the storage module 3400 may be implemented using nonvolatile semiconductor memory devices such as phase-change RAMs (PRAMs), magnetic RAMs (MRAMs), resistive RAMs (ReRAMs), NAND flash memories, NOR flash memories, and three-dimensional (3D) NAND flash memories.

In example embodiments, the storage module 3400 may perform a requested matching key search operation in response to a request from a host based on the key matching management operations described with reference to FIGS. 1 to 8. The storage module 3400 may communicate with the application processor 3100 based on a predetermined interface. The storage module 3400 may adjust execution time of garbage collection based on a write command received from the application processor 3100.

The user interface 3500 may include interfaces that input data or a command to the application processor 3100 or output data to an external device. For example, the user interface 3500 may include user input interfaces such as a keyboard, a keypad, a button, a touch panel, a touch screen, a touch pad, a touch ball, a camera, a microphone, a gyroscope sensor, and a vibration sensor. The user interface 3500 may include user output interfaces such as a liquid crystal display (LCD), an organic light emitting diode (OLED) display, an active matrix OLED (AMOLED), an LED, a speaker, and a monitor.

The above-described memory card, nonvolatile memory device or card controller may be packaged in various types of packages. For example, the nonvolatile memory 1200 or the memory card system 1000 may be packaged in various types of packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

As described above, a solid state drive (SSD) may be provided to minimize a burden of a host during the search of a keyword and decrease the number of transactions with the host. Moreover, since a repeated read operation of reading the same data generated during a key matching operation from a nonvolatile memory device in a solid state drive (SSD) may be suppressed, a memory may be efficiently managed in a server system.

The above-disclosed subject matter is to be considered illustrative, and not restrictive, and the appended claims are intended to cover all such modifications, enhancements, and other features, which fall within the true spirit and scope of inventive concept. Thus, to the maximum extent allowed by law, the scope of inventive concept is to be determined by the broadest permissible interpretation of the following claims and their equivalents, and shall not be restricted or limited by the foregoing detailed description. While some example embodiments have been particularly shown and described, it should be understood by one of ordinary skill in the art that variations in form and detail may be made therein without departing from the spirit and scope of the claims.

What is claimed is:

1. A matching key search method of a server system including a storage device comprising a memory device and a buffer memory configured to store data, the matching key search method comprising:
receiving a search command for a keyword from a host;
reading data from a memory area of the memory device corresponding to an address included in the search command and storing the read data in the buffer memory;
determining whether the read data matches the keyword;
transmitting a result of said determining to the host without transmitting the read data stored in the buffer memory and that corresponds to the address to the host;
generating a matching key table with reference to the result of said determining and storing the generated matching key table in the buffer memory; and
transmitting the read data stored in the buffer memory and that corresponds to the address to the host responsive to a request for the read data by the host and with reference to the matching key table.

2. The matching key search method of claim 1, further comprising:

enabling a direct load/storage channel to provide the host access to the buffer memory in units of bytes.

3. The matching key search method of claim 1, further comprising:
setting the read data to be maintained in the buffer memory when information matching the keyword is determined to be included in the read data.

4. The matching key search method of claim 1, further comprising:
processing the read data according to a state of the storage device when information matching the keyword is determined to be included in the read data.

5. The matching key search method of claim 4, further comprising:
erasing the read data from the buffer memory when a full ratio of the buffer memory is greater than a threshold.

6. The matching key search method of claim 4, further comprising:
erasing the read data from the buffer memory depending on whether a background operation of the storage device is enabled or depending on a wear-level of the storage device.

7. The matching key search method of claim 1, wherein the read data is transmitted to the host via a direct load/storage channel, providing the host to directly control the buffer memory.

8. The matching key search method as set forth in claim 1, wherein the memory device comprises a three-dimensional nonvolatile memory array.

9. A method for operating a storage device configured to receive a matching key search request from a host, the method comprising:
analyzing the matching key search request to extract a keyword and an address range;
allocating a memory area of a buffer memory for executing the matching key search request;
reading original data corresponding to the address range from a nonvolatile memory device and storing the read original data in the memory area of the buffer memory;
determining whether information matching the keyword exists in the read original data;
writing information indicating a result of said determining into a matching key table of the buffer memory; and
transmitting the read original data stored in the buffer memory and that corresponds to the address range to the host responsive to a request by the host and with reference to the matching key table,
wherein the original data is read once from the nonvolatile memory device during the method for operating the storage device irrespective of the result of said determining.

10. The method of claim 9, wherein said determining is performed using an in-storage computing function.

11. The method of claim 9, further comprising:
setting the read original data or address information of the read original data to be maintained in the memory area when the result of said determining is that information matching the keyword exists in the read original data.

12. The method of claim 9, further comprising:
setting the read original data to be erased from the memory area according to a state of the buffer memory or the storage device when the result of said determining is that information matching the keyword does not exist in the read original data.

13. The method as set forth in claim 9, further comprising:
adjusting a size of the memory area according to a size of the read original data.

14. The method as set forth in claim 9, wherein the storage device communicates with the host through at least one of protocols such as Universal Serial Bus (USB), Small Computer System Interface (SCSI), Peripheral Component Interconnect express (PCIe), Advanced Technology Attachment (ATA), Parallel ATA (PATA), Serial ATA (SATA), Serial Attached SCSI (SAS), and Ethernet communication.

15. A matching key search method of a server system including a storage device comprising a memory device and a buffer memory configured to store data, the matching key search method comprising:
receiving a search command for a keyword from a host;
reading data from a memory area of the memory device corresponding to an address included in the search command and storing the read data in the buffer memory;
determining whether the read data matches the keyword;
transmitting a result of said determining to the host via a direct load/storage channel without transmitting the read data stored in the buffer memory and that corresponds to the address to the host; and
thereafter, responsive to a request by the host, transmitting the read data stored in the buffer memory and that corresponds to the address to the host.

16. The matching key search method of claim 15, further comprising generating a matching key table with reference to the result of said determining and storing the generated matching key table in the buffer memory.

17. The matching key search method of claim 15, further comprising:
enabling the direct load/storage channel to provide the host access to the buffer memory in units of bytes.

18. The matching key search method of claim 15, wherein the search command comprises the keyword, a start logical block address (LBA), and a sector or page number of the memory device corresponding to a search range from the start LBA to search for a matching key for the keyword.

19. The matching key search method of claim 15, further comprising:
maintaining the read data in the buffer memory based on any of a full ratio of the buffer memory, a background operation state of the storage device and a wear-level state of the storage device.

* * * * *